US012804722B2

(12) United States Patent
Li

(10) Patent No.: US 12,804,722 B2
(45) Date of Patent: Nov. 17, 2026

(54) RANDOM ACCESS METHOD AND APPARATUS, DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 302 days.

(21) Appl. No.: 18/704,413

(22) PCT Filed: Oct. 28, 2021

(86) PCT No.: PCT/CN2021/127186
§ 371 (c)(1),
(2) Date: Apr. 24, 2024

(87) PCT Pub. No.: WO2023/070468
PCT Pub. Date: May 4, 2023

(65) Prior Publication Data

US 2025/0008565 A1 Jan. 2, 2025

(51) Int. Cl.
*H04W 74/0833* (2024.01)
*H04W 72/044* (2023.01)

(52) U.S. Cl.
CPC ..... *H04W 74/0833* (2013.01); *H04W 72/044* (2013.01)

(58) Field of Classification Search
CPC ........................ H04W 72/044; H04W 74/0833
USPC ........................................................ 370/329
See application file for complete search history.

(56) References Cited

U.S. PATENT DOCUMENTS

| | | | | |
|---|---|---|---|---|
| 12,273,913 B2 * | 4/2025 | Xiong | | H04W 74/004 |
| 12,348,982 B2 * | 7/2025 | Chande | | H04W 56/001 |
| 2019/0349061 A1 | 11/2019 | Cirik et al. | | |
| 2021/0058971 A1 | 2/2021 | MolavianJazi et al. | | |
| 2024/0064491 A1 * | 2/2024 | Babaei | | H04W 4/06 |

FOREIGN PATENT DOCUMENTS

| | | |
|---|---|---|
| WO | WO 2017176033 A1 | 10/2017 |
| WO | WO 2020019762 A1 | 1/2020 |
| WO | WO 2020248270 A1 | 12/2020 |

OTHER PUBLICATIONS

Chinese Patent Application No. 202180003614.3 Second Office Action dated Jun. 3, 2023, with English translation, 16 pages.
Chinese Patent Application No. 202180003614.3 Third Office Action dated Oct. 7, 2023, with English translation, 17 pages.
European Patent Application No. 21961833.7 Search Report dated Jul. 14, 2025, 10 pages.
PCT/CN2021/127186 International Search Report dated Jun. 28, 2022, 2 pages.

* cited by examiner

*Primary Examiner* — Peter G Solinsky
(74) *Attorney, Agent, or Firm* — Cozen O'Connor

(57) ABSTRACT

A random access method includes: determining at least one set of random access resources; and sending a random access preamble to a network device based on the at least one set of random access resources. The random access resource includes at least one of: a time domain resource; a frequency domain resource; a random access preamble; or a quasi co-location parameter.

20 Claims, 3 Drawing Sheets

RANDOM ACCESS METHOD AND APPARATUS, DEVICE, AND STORAGE MEDIUM

CROSS-REFERENCE TO RELATED APPLICATION

This application is a U.S. national phase application of International Application No. PCT/CN2021/127186, filed Oct. 28, 2021, the entire contents of which are incorporated herein by reference.

TECHNICAL FIELD

The present disclosure relates to the field of mobile communications, and more particularly to a random access method, apparatus, device and storage medium.

BACKGROUND

In a new radio (NR) system, a terminal will send a random access preamble via a physical random access channel (PRACH) to implement a random access to a mobile network. In the related art, both an uplink transmission and a downlink transmission of the terminal may perform repeated transmissions. However, the repeated transmissions of the terminal in the PRACH are still a problem that needs to be solved urgently.

SUMMARY

According to a first aspect of the present disclosure, a random access method is provided, which is performed by a terminal and includes: determining at least one set of random access resources; and sending a random access preamble to a network device based on the at least one set of random access resources.

According to a second aspect of the present disclosure, a random access method is provided, which is performed by a network device and includes: receiving a random access preamble sent by a terminal based on at least one set of random access resources.

According to a third aspect of the present disclosure, a terminal is provided, which includes: a processor; a transceiver connected to the processor; and a memory for storing instructions executable by the processor. The processor is configured to load and execute the executable instructions to implement the random access method according to the above aspect.

According to a fourth aspect of the present disclosure, a network device is provided, which includes: a processor; a transceiver connected to the processor; and a memory for storing instructions executable by the processor. The processor is configured to load and execute the executable instructions to implement the random access method according to the above aspect.

BRIEF DESCRIPTION OF THE DRAWINGS

The accompanying drawings to be used in the description of embodiments will be briefly introduced below. Apparently, the drawings in the following description only show some embodiments of the present disclosure. For those ordinarily skilled in the art, other drawings may also be obtained according to these drawings without any creative effort.

DETAILED DESCRIPTION

In order to make the purposes, technical solutions and advantages of the present disclosure clearer, embodiments of the present disclosure will be further described in detail below in conjunction with the accompanying drawings.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with some aspects of the present disclosure as recited in the appended claims.

Terms used in the present disclosure are only for the purpose of describing specific embodiments, but should not be construed to limit the present disclosure. As used in the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated items listed.

It should be understood that, although terms such as "first," "second" and "third" may be used in the present disclosure for describing various information, these information should not be limited by these terms. These terms are only used for distinguishing information of the same type from each other. For example, first information may also be referred to as second information, and similarly, the second information may also be referred to as the first information, without departing from the scope of the present disclosure. For example, as used herein, the term "if" may be construed to mean "when", "upon" or "in response to determining" depending on the context.

The application scenarios of the present disclosure are explained below.

Figure 1:
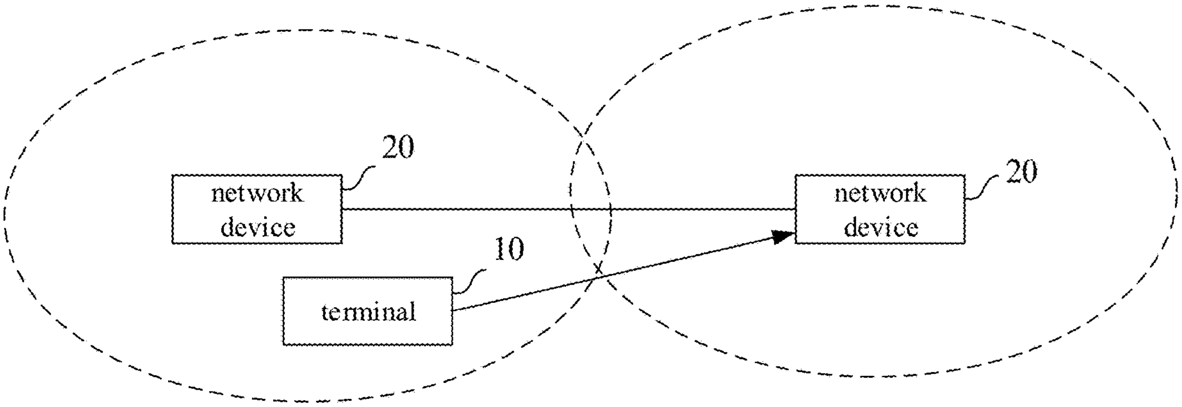
FIG. 1 shows a schematic block diagram of a communication system according to an illustrative embodiment of the present disclosure.

FIG. 1 shows a schematic block diagram of a communication system according to an illustrative embodiment of the present disclosure. The communication system may include: terminals 10 and network devices 20.

The communication system generally includes a plurality of terminals 10, and one or more terminals 10 may be distributed in a cell managed by a network device 20. The terminal 10 may include various devices with wireless communication functions, like handheld devices, vehicle-mounted devices, wearable devices, computing devices or other processing devices connected to wireless modems, as well as various forms of user equipment (UE), mobile stations (MSs) and so on. For convenience of description, in embodiments of the present disclosure, the above-mentioned devices are collectively referred to as terminals.

The network device 20 is a device deployed in an access network to provide the wireless communication function for the terminal 10. The network device 20 may include various forms of macro base stations, micro base stations, relay stations, access points, etc. In systems using different wireless access technologies, the device with the network device function may have different names, for example, it is called gNodeB or gNB in a 5G NR system. As the communication technology evolves, the name of the "network device" may change. For convenience of description, in embodiments of the present disclosure, the above-mentioned devices that provide the wireless communication function for the terminal 10 are collectively referred to as network devices. A connection may be established between the network device 20 and the terminal 10 via a radio, so that communications, including signaling and data interactions, may be performed through the connection. There may be a plurality of network devices 20, and two adjacent network devices 20 may communicate in a wired or wireless manner. The terminal 10 may hand over between different network devices 20, that is, establish connections with different network devices 20.

The "5G NR system" in embodiments of the present disclosure may also be called a 5G system or an NR system, and those skilled in the art may understand their meaning. The technical solutions described in embodiments of the present disclosure may be applied to the 5G NR system, and may also be applied to an evolution system subsequent to the 5G NR system.

Figure 2:
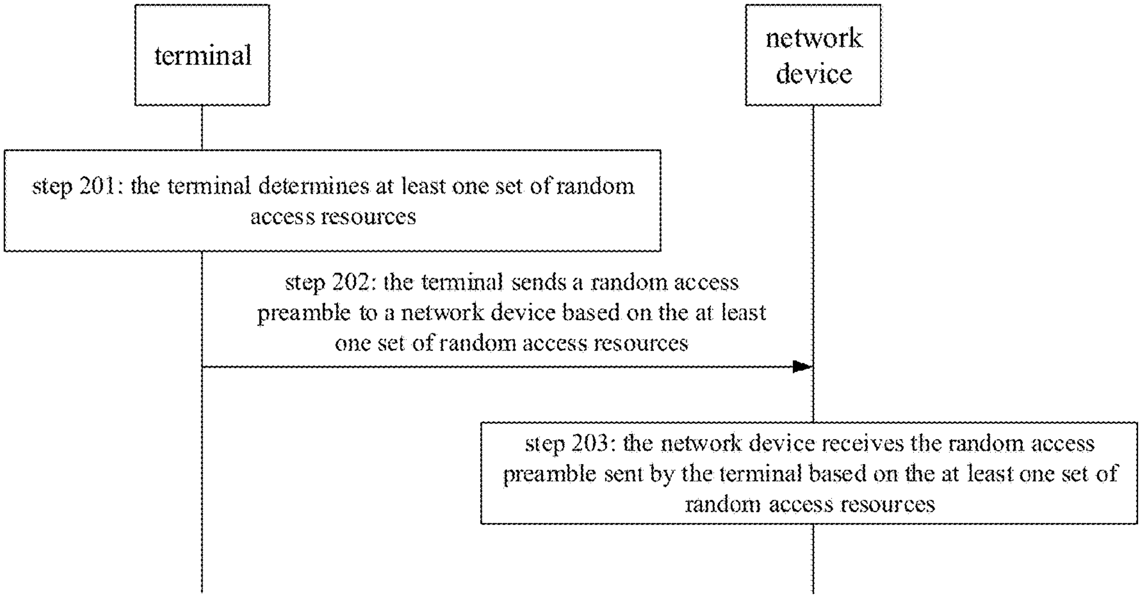
FIG. 2 shows a schematic flow chart of a random access method according to an illustrative embodiment of the present disclosure.

FIG. 2 shows a schematic flow chart of a random access method according to an illustrative embodiment of the present disclosure, which is performed by a terminal shown in FIG. 1. The method includes at least some of following contents.

In step 201, the terminal determines at least one set of random access resources.

The at least one set of random access resources of the terminal is used to repeatedly transmit a random access preamble to facilitate the terminal to perform a random access.

In embodiments of the present disclosure, the terminal may determine the at least one set of random access resources, determine resources included in each set of random access resources, and subsequently transmit the random access preamble based on the determined resources.

In some embodiments, the random access resource includes at least one of:

(1) a time domain resource, which indicates a time at which the random access preamble is transmitted, for example, the time domain resource indicates at which symbols of which slot the random access preamble is transmitted;

(2) a frequency domain resource, which indicates a frequency band where the random access preamble is transmitted, for example, the frequency domain resource indicates which physical resource blocks are used to transmit the random access preamble;

(3) a random access preamble, which is used to perform the random access; or (4) a quasi co-location parameter.

The quasi co-location parameter includes a quasi co-location (QCL) type D, and the QCL type D is used to indicate a spatial reception parameter (Spatial Rx parameter) or a spatial transmitting parameter (a spatial filter, or a spatial setting), and may be carried by a transmission configuration indication (TCI) state or a spatial relationship information (spatialrelationinfo). The QCL Type D is commonly known as a beam. The quasi co-location parameter also includes a QCL Type A parameter, which includes a Doppler shift, a Doppler spread, an average delay, and a delay spread. The quasi co-location parameter also includes a QCL Type B parameter, which includes a Doppler shift and a Doppler spread. The quasi co-location parameter also includes a QCL Type C parameter, which includes a Doppler shift and an average delay.

In step 202, the terminal sends a random access preamble to a network device based on the at least one set of random access resources.

In embodiments of the present disclosure, each set of random access resources include resources for transmitting the random access preamble, and the terminal uses the at least one set of random access resources to send the random access preamble to the network device.

The terminal may use each set of random access resources to send the random access preamble once. Therefore, the terminal may repeatedly send the random access preamble to the network device through the at least one set of random access resources determined.

In step 203, the network device receives the random access preamble sent by the terminal based on the at least one set of random access resources.

In embodiments of the present disclosure, the terminal sends the random access preamble based on the at least one set of random access resources, and the network device receives the random access preamble sent by the terminal based on the at least one set of random access resources.

The terminal realizes the repeated transmissions of the random access preamble to the network device, and the network device also realizes the repeated receptions of the random access preamble.

After receiving the random access preamble sent by the terminal, the network device returns a random access response based on the random access preamble, and the terminal performs subsequent steps of the random access based on the random access response.

In the method according to embodiments of the present disclosure, the terminal sends the random access preamble to the network device based on the at least one set of random access resources determined. Since the terminal may repeatedly send the random access preamble based on the at least one set of random access resources, the repeated transmissions of the random access preamble are implemented, thereby improving a success rate of random access of the terminal.

On the basis of embodiments shown in FIG. 2, the terminal determines at least two sets of random access resources. For the at least two sets of random access resources, the at least two sets of random access resources may be determined to be different, if at least one of following situations exists.

In a first situation, the at least two sets of random access resources include frequency domain resources, and the frequency domain resources included in any two sets of random access resources of the at least two sets of random access resources are different.

The terminal determines the at least two sets of random access resources including the frequency domain resources. For any two sets of random access resources in the at least two sets of random access resources, the frequency domain resources included therein are different. Therefore, it is indicated that the at least two sets of random access resources are different random access resources.

For example, the terminal determines three sets of random access resources, including a first set of random access resources, a second set of random access resources and a third set of random access resources. Since the frequency domain resources included in any two sets of random access resources are different, the frequency domain resource included in the first set of random access resources is frequency domain resource 1, the frequency domain resource included in the second set of random access resources is frequency domain resource 2, and the frequency domain resource included in the third set of random access resources is frequency domain resource 3.

In some embodiments, the frequency domain resources included in the at least two sets of random access resources include any of following cases.

1. The Frequency Domain Resources of the at Least Two Sets of Random Access Resources are Continuous.

Each set of random access resources correspond to a frequency domain resource, and the frequency domain resources of the at least two sets of random access resources are continuous. It may also be understood that the frequency domain resources of any two adjacent sets of random access resources are continuous.

The continuous frequency domain resources mean that there is no interval between an ending position of a frequency domain resource of a set of random access resources and a starting position of a frequency domain resource of another set of random access resources.

For example, the frequency domain resource of the first set of random access resources includes resource blocks (RB) from RB#0 to RB#5, the frequency domain resource of the second set of random access resources includes RB#6 to RB#11, and the frequency domain resource of the third set of random access resources includes RB#12 to RB#17, which means that the frequency domain resource of the first set of random access resources, the frequency domain resource of the second set of random access resources and the frequency domain resource of the third set of random access resources are continuous.

2. The Frequency Domain Resources of the at Least Two Sets of Random Access Resources are Discontinuous.

Each set of random access resources correspond to a frequency domain resource, and the frequency domain resources of the at least two sets of random access resources are discontinuous. It may also be understood that the frequency domain resources of any two adjacent sets of random access resources are discontinuous.

The discontinuous frequency domain resources mean that there is a frequency interval between an ending position of a frequency domain resource of a set of random access resources and a starting position of a frequency domain resource of another adjacent set of random access resources.

For example, the frequency domain resource of the first set of random access resources includes RB#0 to RB#5, the frequency domain resource of the second set of random access resources includes RB#10 to RB#15, and the frequency domain resource of the third set of random access resources includes RB#20 to RB#25, which means that the frequency domain resource of the first set of random access resources, the frequency domain resource of the second set of random access resources, and the frequency domain resource of the third set of random access resources are discontinuous.

In a second situation, the at least two sets of random access resources include time domain resources, and the time domain resources included in any two sets of random access resources of the at least two sets of random access resources are different.

The terminal determines the at least two sets of random access resources including the time domain resources. For any two sets of random access resources in the at least two sets of random access resources, the time domain resources included therein are different. Therefore, it is indicated that the at least two sets of random access resources are different random access resources.

For example, the terminal determines three sets of random access resources, including a first set of random access resources, a second set of random access resources and a third set of random access resources. Since the time domain resources included in any two sets of random access resources are different, the time domain resource included in the first set of random access resources is time domain resource 1, the time domain resource included in the second set of random access resources is time domain resource 2, and the time domain resource included in the third set of random access resources is time domain resource 3.

In some embodiments, the time domain resources included in the at least two sets of random access resources include any of following cases.

1. The Time Domain Resources of the at Least Two Sets of Random Access Resources are Continuous.

Each set of random access resources correspond to a time domain resource, and the time domain resources of the at least two sets of random access resources are continuous.

The continuous time domain resources mean that there is no interval between an ending position of a time domain resource of a set of random access resources and a starting position of a time domain resource of another set of random access resources.

For example, a slot includes 14 symbols. The time domain resource of the first set of random access resources includes symbol #0 to symbol #6 of slot #0, the time domain resource of the second set of random access resources includes symbol #7 to symbol #13 of the slot #0, and the time domain resource of the third set of random access resources includes symbol #0 to symbol #6 of slot #1, which means that the time domain resource of the first set of random access resources, the time domain resource of the second set of random access resources and the time domain resource of the third set of random access resources are continuous.

2. The Time Domain Resources of the at Least Two Sets of Random Access Resources are Discontinuous.

Each set of random access resources correspond to a time domain resource, and the time domain resources of the at least two sets of random access resources are discontinuous.

The discontinuous time domain resources mean that there is a duration between an ending position of a time domain resource of a set of random access resources and a starting position of a time domain resource of another adjacent set of random access resources.

For example, a slot includes 14 symbols. The time domain resource of the first set of random access resources includes symbol #0 to symbol #6 of slot #0, the time domain resource of the second set of random access resources includes symbol #0 to symbol #6 of slot #1, and the time domain resource of the third set of random access resources includes symbol #0 to symbol #6 of slot #2, which means that the time domain resource of the first set of random access resources, the time domain resource of the second set of random access resources, and the time domain resource of the third set of random access resources are discontinuous.

In a third situation, the at least two sets of random access resources include random access preambles, and the random access preambles included in any two sets of random access resources of the at least two sets of random access resources are different.

The terminal determines the at least two sets of random access resources including the random access preambles. For any two sets of random access resources in the at least two sets of random access resources, the random access preambles included therein are different. Therefore, it is indicated that the at least two sets of random access resources are different random access resources.

For example, the terminal determines three sets of random access resources, including a first set of random access resources, a second set of random access resources and a third set of random access resources. Since the random access preambles included in any two sets of random access resources are different, the random access preamble included in the first set of random access resources is random access preamble 1, the random access preamble included in the second set of random access resources is random access preamble 2, and the random access preamble included in the third set of random access resources is random access preamble 3.

In some embodiments, the random access preambles included in the at least two sets of random access resources belong to random access preambles corresponding to a same synchronization signal block (SSB) or channel state information reference signal (CSI-RS). The random access preambles corresponding to the CSI-RS are random access preambles corresponding to the SSB having a same QCL Type D parameter as the CSI-RS.

The terminal receives SSBs or CSI-RSs sent by the network device, and each SSB or CSI-RS corresponds to a plurality of random access preambles. The terminal may determine one SSB or CSI-RS from the received SSBs or CSI-RSs, and determine the random access preambles included in the at least two sets of random access resources from a plurality of random access preambles corresponding to the determined SSB or CSI-RS.

In some embodiments, the terminal determines an SSB or CSI-RS having a reference signal received power (RSRP) greater than a preset threshold, and determines random access preambles of the random access resources according to the determined SSB or CSI-RS. The random access preambles corresponding to the CSI-RS are random access preambles corresponding to the SSB having a same QCL Type D parameter as the CSI-RS.

In some embodiments, the terminal may obtain a corresponding relationship between the SSB and the random access preambles, the corresponding relationship includes a plurality of random access preambles corresponding to the SSB, and the terminal determines the plurality of random access preambles corresponding to the SSB according to the corresponding relationship. Alternatively, the terminal may obtain a corresponding relationship between the CSI-RS and the random access preambles, the corresponding relationship includes a plurality of random access preambles corresponding to the CSI-RS, and the terminal determines the plurality of random access preambles corresponding to the CSI-RS according to the corresponding relationship. The random access preambles corresponding to the CSI-RS are random access preambles corresponding to the SSB having a same QCL Type D parameter as the CSI-RS.

In some embodiments, the corresponding relationship between the SSB or CSI-RS and a plurality of random access preambles is transmitted via system broadcast information.

For example, the terminal determines an SSB, and the SSB corresponds to random access preamble 1, random access preamble 2, random access preamble 3 and random access preamble 4. The terminal determines two sets of random access resources, and the terminal may select two random access preambles from the random access preamble 1, the random access preamble 2, the random access preamble 3 and the random access preamble 4 as random access preambles included in the two sets of random access resources, respectively.

In some other embodiments, the random access preambles included in the at least two sets of random access resources belong to random access preambles corresponding to different SSBs or CSI-RSs.

The terminal receives SSBs or CSI-RSs sent by the network device, and each SSB or CSI-RS corresponds to a plurality of random access preambles. The terminal may determine a same number of SSBs or CSI-RSs from the received SSBs or CSI-RSs as the number of sets of the random access resources, and determine the random access preamble included in individual sets of random access resources from a plurality of random access preambles corresponding to the determined SSBs or CSI-RSs. The random access preamble corresponding to the CSI-RS is a random access preamble corresponding to the SSB having a same QCL Type D parameter as the CSI-RS.

In some embodiments, the terminal may obtain a corresponding relationship between the SSB and the random access preambles, the corresponding relationship includes a plurality of random access preambles corresponding to the SSB, and the terminal determines the plurality of random access preambles corresponding to the SSB according to the corresponding relationship. Alternatively, the terminal may obtain a corresponding relationship between the CSI-RS and the random access preambles, the corresponding relationship includes a plurality of random access preambles corresponding to the CSI-RS, and the terminal determines the plurality of random access preambles corresponding to the CSI-RS according to the corresponding relationship. The random access preambles corresponding to the CSI-RS are random access preambles corresponding to the SSB having a same QCL Type D parameter as the CSI-RS.

In some embodiments, the corresponding relationship between the SSB or CSI-RS and a plurality of random access preambles is transmitted via system broadcast information.

For example, the terminal determines two sets of random access resources, and the terminal determines two SSBs, namely SSB1 and SSB2. Each SSB corresponds to a plurality of random access preambles. The terminal may determine the random access preamble of the first set of random access resources from a plurality of random access preambles corresponding to the SSB1, and determine the random access preamble of the second set of random access resources from a plurality of random access preambles corresponding to the SSB2.

In a fourth situation, the at least two sets of random access resources include quasi co-location parameters, and the quasi co-location parameters of any two sets of random access resources of the at least two sets of random access resources are different.

The terminal determines the at least two sets of random access resources including the quasi co-location parameters. For any two sets of random access resources in the at least two sets of random access resources, the quasi co-location parameters included therein are different. Therefore, it is indicated that the at least two sets of random access resources are different random access resources.

For example, the terminal determines two sets of random access resources, including a first set of random access resources and a second set of random access resources. Since the quasi co-location parameters included in any two sets of random access resources are different, a quasi co-location parameter included in the first set of random access resources is quasi co-location parameter 1, and a quasi co-location parameter included in the second set of random access resources is quasi co-location parameter 2.

In some embodiments, the quasi co-location parameters of the at least two sets of random access resources correspond to different SSBs.

The terminal receives SSBs sent by the network device, and different SSBs correspond to different quasi co-location parameters. The terminal may determine a same number of SSBs from the received SSBs as the number of the at least two sets of random access resources, and determine quasi co-location parameters corresponding to the determined SSBs as quasi co-location parameters included in the at least two sets of random access resources, respectively.

For example, the terminal determines two SSBs, namely SSB1 and SSB2. The terminal determines a quasi co-location parameter corresponding to the SSB1 as the quasi co-location parameter of the first set of random access resources, and determines a quasi co-location parameter corresponding to the SSB2 as the quasi co-location parameter of the second set of random access resources.

In some other embodiments, the quasi co-location parameters of the at least two sets of random access resources are at least one of quasi co-location parameters indicated by a radio resource control (RRC).

The terminal receives an RRC sent by the network device, the RRC indicates at least one quasi co-location parameter, and the terminal may determine the quasi co-location parameters of the at least two sets of random access resources from the at least one quasi co-location parameter indicated by the RRC.

In some embodiments, the terminal determines a quasi co-location parameter corresponding to an SSB with the smallest SSB index from the quasi co-location parameters indicated by the RRC.

In some embodiments, the terminal determines a quasi co-location parameter corresponding to an SSB or CSI-RS with the largest RSRP from the quasi co-location parameters indicated by the RRC.

In some embodiments, the RRC signaling is an RRC connection reconfiguration, or the RRC signaling is an RRC signaling carrying an indication of a target cell in a handover process.

In some other embodiments, the quasi co-location parameters of the at least two sets of random access resources are at least one of quasi co-location parameters indicated by downlink control information (DCI) carried by a physical downlink control channel (PDCCH).

When the DCI indicates two quasi co-location parameters, the terminal may determine the two quasi co-location parameters as quasi co-location parameters of the random access resources, or determine one of the two quasi co-location parameters as a quasi co-location parameter of the random access resources. When only one of the two quasi co-location parameters is determined as the quasi co-location parameter of the random access resources, a quasi co-location parameter corresponding to a reference signal with a larger reference signal received power (RSRP) or reference signal received quality (RSRQ) or signal to interference plus noise ratio (SINR) value may be selected.

The terminal receives a DCI sent by the network device, the DCI carries a PDCCH order and indicates at least one quasi co-location parameter, and the terminal may determine the quasi co-location parameters of the at least two sets of random access resources from the at least one quasi co-location parameter indicated by the DCI. The PDCCH order is used to trigger a random access process.

In some other embodiments, the quasi co-location parameters of the at least two sets of random access resources are two of quasi co-location parameters used for receiving the PDCCH order.

The terminal needs to receive the PDCCH order sent by the network device through the quasi co-location parameters. When the terminal determines the quasi co-location parameters of the at least two sets of random access resources, it determines the two quasi co-location parameters used for receiving the PDCCH order as two quasi co-location parameters of random access resources.

In some other embodiments, the quasi co-location parameters of the at least two sets of random access resources are one of two quasi co-location parameters used for receiving the PDCCH order.

The terminal needs to receive the PDCCH order sent by the network device through the quasi co-location parameters. When the terminal determines the quasi co-location parameters of the at least two sets of random access resources, it determines one of the two quasi co-location parameters used for receiving the PDCCH order as one quasi co-location parameter of random access resources.

In some embodiments, when the terminal determines one of the two quasi co-location parameters used for receiving the PDCCH order as one quasi co-location parameter of random access resources, the terminal receives the PDCCH order sent by the network device through two PDCCH candidates (candidate sets). These two PDCCH candidates belong to two different SS sets, and these two SS sets are associated with their respective control resource sets (CORESETs). The terminal determines a quasi co-location parameter corresponding to a CORESET with a smaller CORESET identity document (ID) in the two CORESETs or a quasi co-location parameter of a CORESET associated with an SS set with a smaller SS set ID in the two SS sets as one quasi co-location parameter of random access resources.

In some embodiments, when the terminal determines one of the two quasi co-location parameters used for receiving the PDCCH order as one quasi co-location parameter of random access resources, the terminal receives the PDCCH order sent by the network device through two PDCCH candidates. These two PDCCH candidates belong to two different SS sets, and these two SS sets are associated with their respective CORESETs. The terminal determines a block error rate (BLER) or a signal to interference plus noise ratio (SINR) of each of the two PDCCH candidates, and determines a quasi co-location parameter of a CORESET corresponding to a PDCCH candidate with a better BLER or SINR as one quasi co-location parameter of random access resources.

In the method according to embodiments of the present disclosure, the terminal determines at least two sets of random access resources which are different from each other in terms of at least one parameter, and may send the random access preambles based on the at least two sets of random access resources to perform a random access, which improves a success rate of the random access of the terminal while improving the diversity for determining the random access resources.

It should be noted that embodiments of the present disclosure are described with reference to examples where at least two sets of random access resources have at least one of the above four situations. That is, in embodiments of the present disclosure, there are cases where any two sets of random access resources of the at least two sets of random access resources are different in terms of at least one of the frequency domain resource, the time domain resource, the random access preamble, and the quasi co-location parameter.

In another embodiment, if there are differences in terms of at least one of the frequency domain resource, the time domain resource, the random access preamble, and the quasi co-location parameter, the rest of these parameters are the same. For example, if any two sets of random access resources include different frequency domain resources, the any two sets of random access resources may include the same time domain resource, the same random access preamble and the same quasi co-location parameter. That is, the terminal sends the same random access preamble using the same quasi co-location parameter, the same time domain resource, and different frequency domain resources.

For another example, if any two sets of random access resources include different time domain resources and different random access preambles, the any two sets of random access resources may include the same frequency domain resources and the same quasi co-location parameter. That is, the terminal sends different random access preambles using the same quasi co-location parameter and the same frequency domain resource on different time domain resources.

In addition, situations where other parameters are different but the remaining parameters are the same are similar to the above situations and will not be described again here.

Figure 3:
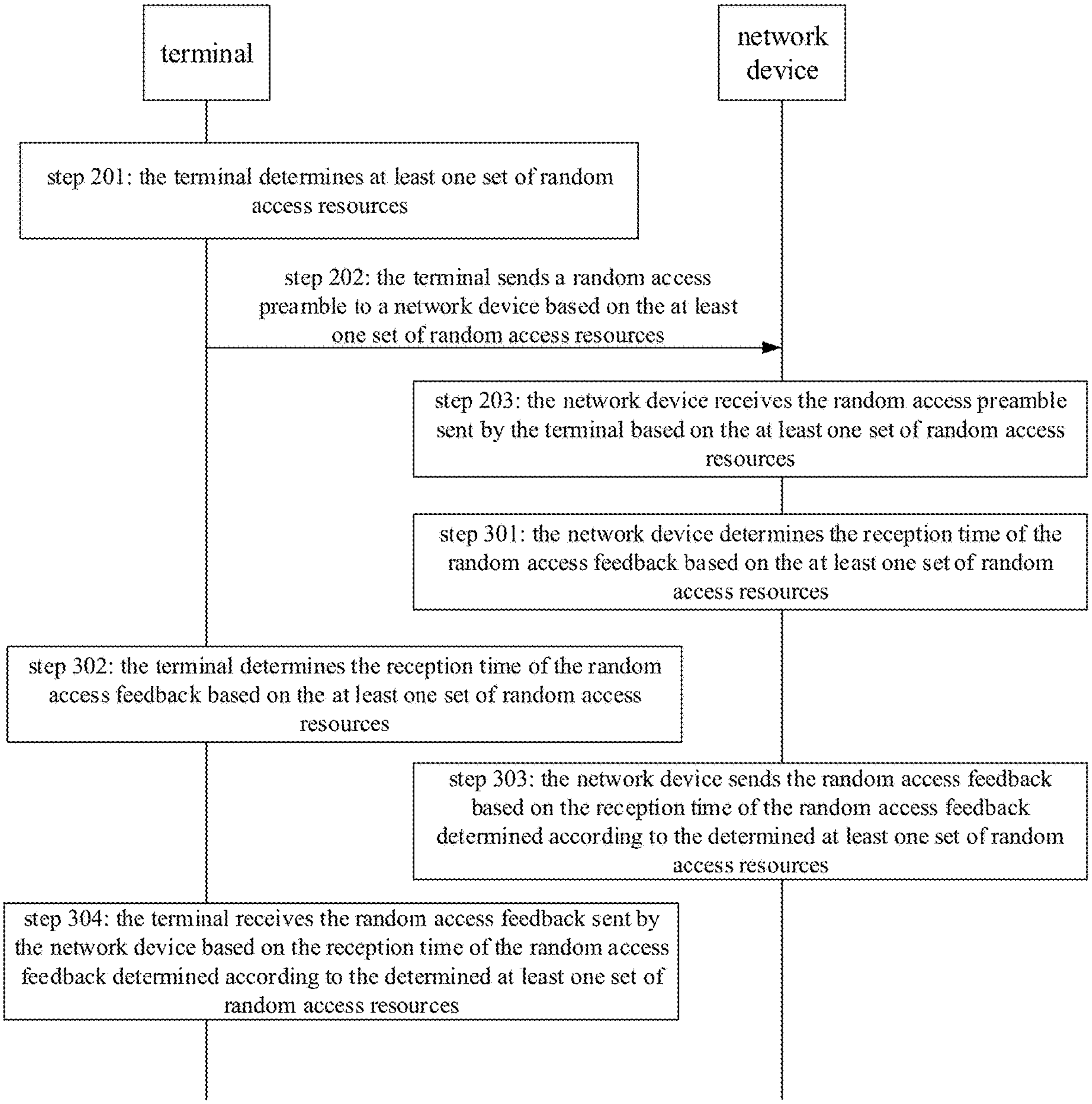
FIG. 3 shows a schematic flow chart of a random access method according to an illustrative embodiment of the present disclosure.

On the basis of embodiments shown in FIG. 2, after the network device receives the random access preamble sent by the terminal, the network device will return a random access feedback. The terminal needs to determine a reception time of the random access feedback corresponding to the at least one set of random access resources. For details, reference may be made to embodiments shown in FIG. 3.

In step 301, the network device determines the reception time of the random access feedback based on the at least one set of random access resources.

In step 302, the terminal determines the reception time of the random access feedback based on the at least one set of random access resources.

After receiving the random access preamble sent by the terminal, the network device will return the random access feedback based on the random access preamble. Both the terminal and the network device need to determine the reception time for the terminal to receive the random access feedback.

Each set of random access resources include a time domain resource, and the terminal determines the reception time of the random access feedback based on the time domain resource in the at least one set of random access resources.

In some embodiments, determining the reception time of the random access feedback includes any one of following situations.

(1) The Reception Time is Determined According to a Last Symbol of a Time Domain Resource in Each Set of Random Access Resources.

The terminal determines the at least one set of random access resources, determines a reception time according to each set of random access resources, and determines a PDCCH occasion next to the last symbol of the time domain resource in each set of random access resources as a starting reception time.

(2) The Reception Time is Determined According to a Last Symbol of a Last Time Domain Resource in the at Least One Set of Random Access Resources.

The terminal determines the at least one set of random access resources, determines a reception time according to the at least one set of random access resources, and determines a PDCCH occasion next to the last symbol of the last time domain resource in all random access resources as a starting reception time.

In step 303, the network device sends the random access feedback based on the reception time of the random access feedback determined according to the determined at least one set of random access resources.

In step 304, the terminal receives the random access feedback sent by the network device based on the reception time of the random access feedback determined according to the determined at least one set of random access resources.

It should be noted that embodiments of the present disclosure are described only with reference to examples of performing the steps 301 to 304. In another embodiment, the steps 301 to 302 may be performed simultaneously, or the step 302 may be performed before the step 301, or the step 301 may be performed after the step 303, which are not limited in embodiments of the present disclosure.

In the method according to embodiments of the present disclosure, both the network device and the terminal determine the reception time of the random access feedback, so that the network device sends the random access feedback according to the determined reception time, and the terminal receives the random access feedback according to the determined reception time, thereby improving an accuracy of transmitting the random access feedback.

Figure 4:
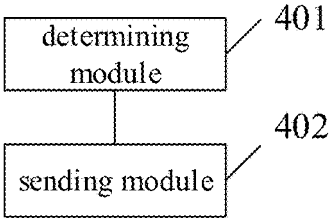
FIG. 4 shows a schematic block diagram of a random access apparatus according to an illustrative embodiment of the present disclosure.

FIG. 4 shows a schematic block diagram of a random access apparatus according to an illustrative embodiment of the present disclosure. Referring to FIG. 4, the apparatus includes: a determining module 401 configured to determine at least one set of random access resources; and a sending module 402 configured to send a random access preamble to a network device based on the at least one set of random access resources.

In some embodiments, the random access resource includes at least one of: a time domain resource; a frequency domain resource; a random access preamble; or a quasi co-location parameter.

In some other embodiments, at least two sets of random access resources include frequency domain resources; and the frequency domain resources included in any two sets of random access resources of the at least two sets of random access resources are different.

In some other embodiments, the frequency domain resources of the at least two sets of random access resources are continuous, or the frequency domain resources of the at least two sets of random access resources are discontinuous.

In some other embodiments, at least two sets of random access resources include time domain resources; and the time domain resources included in any two sets of random access resources of the at least two sets of random access resources are different.

In some other embodiments, the time domain resources of the at least two sets of random access resources are continuous, or the time domain resources of the at least two sets of random access resources are discontinuous.

In some other embodiments, at least two sets of random access resources include random access preambles; and the random access preambles included in any two sets of random access resources of the at least two sets of random access resources are different.

In some other embodiments, the random access preambles included in the at least two sets of random access resources belong to random access preambles corresponding to a same SSB or CSI-RS.

In some other embodiments, the random access preambles included in the at least two sets of random access resources belong to random access preambles corresponding to different SSBs or CSI-RSs.

In some other embodiments, at least two sets of random access resources include quasi co-location parameters; and the quasi co-location parameters of any two sets of random access resources of the at least two sets of random access resources are different.

In some other embodiments, the quasi co-location parameters of the at least two sets of random access resources correspond to different SSBs.

In some other embodiments, beams of the at least two sets of random access resources are at least one of quasi co-location parameters indicated by an RRC.

In some other embodiments, beams of the at least two sets of random access resources are at least one of quasi co-location parameters indicated by DCI.

In some other embodiments, the quasi co-location parameters of the at least two sets of random access resources are at least one of quasi co-location parameters used for receiving a PDCCH order.

In some other embodiments, the apparatus further includes: the determining module 401 configured to determine a reception time of a random access feedback based on the at least one set of random access resources.

In some other embodiments, the reception time is determined according to a last symbol of a time domain resource in each set of random access resources; or the reception time is determined according to a last symbol of a last time domain resource in the at least one set of random access resources.

Figure 5:
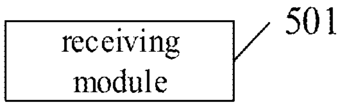
FIG. 5 shows a schematic block diagram of a random access apparatus according to an illustrative embodiment of the present disclosure.

FIG. 5 shows a schematic block diagram of a random access apparatus according to an illustrative embodiment of the present disclosure. Referring to FIG. 5, the apparatus includes: a receiving module 501 configured to receive a random access preamble sent by a terminal based on at least one set of random access resources.

In some embodiments, the random access resource includes at least one of: a time domain resource; a frequency domain resource; a random access preamble; or a quasi co-location parameter.

In some other embodiments, at least two sets of random access resources include frequency domain resources; and the frequency domain resources included in any two sets of random access resources of the at least two sets of random access resources are different.

In some other embodiments, the frequency domain resources of the at least two sets of random access resources are continuous, or the frequency domain resources of the at least two sets of random access resources are discontinuous.

In some other embodiments, at least two sets of random access resources include time domain resources; and the time domain resources included in any two sets of random access resources of the at least two sets of random access resources are different.

In some other embodiments, the time domain resources of the at least two sets of random access resources are continuous, or the time domain resources of the at least two sets of random access resources are discontinuous.

In some other embodiments, at least two sets of random access resources include random access preambles; and the random access preambles included in any two sets of random access resources of the at least two sets of random access resources are different.

In some other embodiments, the random access preambles included in the at least two sets of random access resources belong to random access preambles corresponding to a same SSB or CSI-RS.

In some other embodiments, the random access preambles included in the at least two sets of random access resources belong to random access preambles corresponding to different SSBs or CSI-RSs.

In some other embodiments, at least two sets of random access resources include quasi co-location parameters; and the quasi co-location parameters of any two sets of random access resources of the at least two sets of random access resources are different.

In some other embodiments, the quasi co-location parameters of the at least two sets of random access resources correspond to different SSBs.

In some other embodiments, the quasi co-location parameters of the at least two sets of random access resources are at least one of quasi co-location parameters indicated by an RRC.

In some other embodiments, the quasi co-location parameters of the at least two sets of random access resources are at least one of quasi co-location parameters indicated by DCI.

In some other embodiments, the quasi co-location parameters of the at least two sets of random access resources are at least one of quasi co-location parameters used for receiving a PDCCH order.

Figure 6:
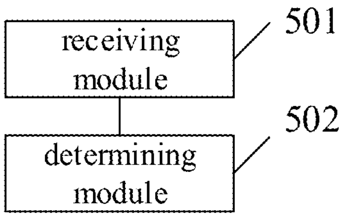
FIG. 6 shows a schematic block diagram of a random access apparatus according to an illustrative embodiment of the present disclosure.

In some other embodiments, referring to FIG. 6, the apparatus further includes: a determining module 502 configured to determine a reception time of a random access feedback based on the at least one set of random access resources.

In some other embodiments, the reception time is determined according to a last symbol of a time domain resource in each set of random access resources; or the reception time is determined according to a last symbol of a last time domain resource in the at least one set of random access resources.

Figure 7:
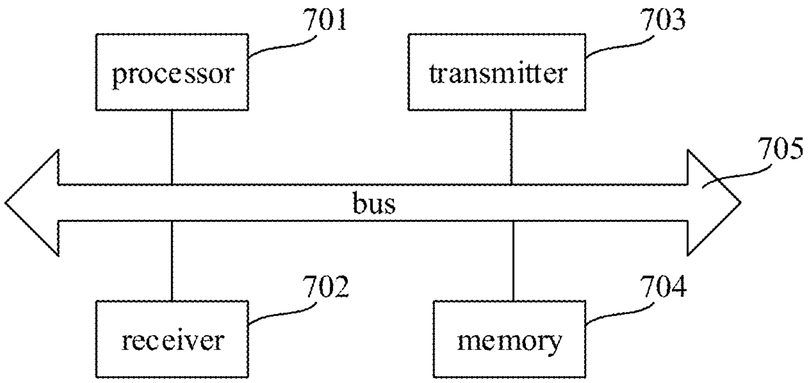
FIG. 7 shows a schematic block diagram of a communication device according to an illustrative embodiment of the present disclosure.

FIG. 7 shows a schematic block diagram of a communication device according to an illustrative embodiment of the present disclosure. The communication device includes: a processor 701, a receiver 702, a transmitter 703, a memory 704 and a bus 705.

The processor 701 includes one or more processing cores. The processor 701 executes various functional applications and information processing by running software programs and modules.

The receiver 702 and the transmitter 703 may be implemented as a communication component such as a transceiver, and the communication component may be a communication chip.

The memory 704 is connected to the processor 701 via the bus 705.

The memory 704 may be used to store at least one program code, and the processor 701 is used to execute the at least one program code to implement various steps in the above method embodiments.

Moreover, the communication device may be a terminal or a network device. The memory 704 may be implemented using any type of volatile or non-volatile storage devices, or a combination thereof, including, but not limited to: a magnetic or optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM).

In an illustrative embodiment, a computer-readable storage medium is also provided. The computer-readable storage medium has stored therein an executable program code, and the executable program code is loaded and executed by the processor to implement the random access method performed by the communication device according to the above various method embodiments.

In an illustrative embodiment, a chip is provided, which includes a programmable logic circuit and/or program instructions for implementing the random access method according to various method embodiments when the chip is run on a terminal or a network device.

In an illustrative embodiment, a computer program product is provided which, when executed by a processor of a terminal or a network device, is configured to implement the random access method according to the above various method embodiments.

Those ordinarily skilled in the art shall understand that all or some of the steps to implement the above embodiments may be completed by a hardware, or may be completed by programs commanding the related hardware. The program may be stored in a computer-readable storage medium. The storage medium mentioned above may be a read-only memory, a magnetic disk, or an optical disk, etc.

The above descriptions only involve optional embodiments of the present disclosure and are not intended to limit the present disclosure. Any modifications, equivalent substitutions, improvements, etc. made within the principles of the present disclosure shall be included in the protection scope of the present disclosure.

What is claimed is:

1. A random access method, performed by a terminal, comprising:

determining at least one set of random access resources; and sending a random access preamble to a network device based on the at least one set of random access resources;

wherein the method further comprises:

determining a reception time of a random access feedback according to a last symbol of a time domain resource in each set of random access resources; or determining a reception time of a random access feedback according to a last symbol of a last time domain resource in the at least one set of random access resources.

2. The method according to claim 1, wherein the random access resource comprises at least one of:

a time domain resource;

a frequency domain resource;

a random access preamble; or a quasi co-location parameter.

3. The method according to claim 2, wherein at least two sets of random access resources comprise at least one of:

frequency domain resources; and the frequency domain resources comprised in any two sets of random access resources of the at least two sets of random access resources being different, time domain resources; and the time domain resources comprised in any two sets of random access resources of the at least two sets of random access resources being different, random access preambles; and the random access preambles comprised in any two sets of random access resources of the at least two sets of random access resources being different, or quasi co-location parameters; and the quasi co-location parameters of any two sets of random access resources of the at least two sets of random access resources being different.

4. The method according to claim 3, wherein the frequency domain resources of the at least two sets of random access resources are continuous, or the frequency domain resources of the at least two sets of random access resources are discontinuous.

5. The method according to claim 3, wherein the time domain resources of the at least two sets of random access resources are continuous, or the time domain resources of the at least two sets of random access resources are discontinuous.

6. The method according to claim 3, wherein the random access preambles comprised in the at least two sets of random access resources belong to random access preambles corresponding to a same synchronization signal block (SSB) or channel state information reference signal (CSI-RS); or the random access preambles comprised in the at least two sets of random access resources belong to random access preambles corresponding to different SSBs or CSI-RSs.

7. The method according to claim 3, wherein the quasi co-location parameters of the at least two sets of random access resources correspond to different SSBs, or the quasi co-location parameters of the at least two sets of random access resources are at least one of quasi co-location parameters indicated by a radio resource control (RRC) or downlink control information (DCI), or are at least one of quasi co-location parameters used for receiving a physical downlink control channel (PDCCH) order.

8. A random access method, performed by a network device, comprising:

receiving a random access preamble sent by a terminal based on at least one set of random access resources;

wherein the method further comprises:

determining a reception time of a random access feedback according to a last symbol of a time domain resource in each set of random access resources; or determining a reception time of a random access feedback according to a last symbol of a last time domain resource in the at least one set of random access resources.

9. The method according to claim 8, wherein the random access resource comprises at least one of:

a time domain resource;

a frequency domain resource;

a random access preamble; or a quasi co-location parameter.

10. The method according to claim 9, wherein at least two sets of random access resources comprise at least one of:

frequency domain resources; and the frequency domain resources comprised in any two sets of random access resources of the at least two sets of random access resources being different, time domain resources; and the time domain resources comprised in any two sets of random access resources of the at least two sets of random access resources being different, random access preambles; and the random access preambles comprised in any two sets of random access resources of the at least two sets of random access resources being different, or quasi co-location parameters; and the quasi co-location parameters of any two sets of random access resources of the at least two sets of random access resources being different.

11. The method according to claim 10, wherein the frequency domain resources of the at least two sets of random access resources are continuous, or the frequency domain resources of the at least two sets of random access resources are discontinuous.

12. The method according to claim 10, wherein the time domain resources of the at least two sets of random access resources are continuous, or the time domain resources of the at least two sets of random access resources are discontinuous.

13. The method according to claim 10, wherein the random access preambles comprised in the at least two sets of random access resources belong to random access preambles corresponding to a same SSB or CSI-RS; or the random access preambles comprised in the at least two sets of random access resources belong to random access preambles corresponding to different SSBs or CSI-RSs.

14. The method according to claim 10, wherein the quasi co-location parameters of the at least two sets of random access resources correspond to different SSBs, or the quasi co-location parameters of the at least two sets of random access resources are at least one of quasi co-location parameters indicated by an RRC or DCI, or are at least one of quasi co-location parameters used for receiving a PDCCH order.

15. A terminal, comprising:

a processor; and a transceiver connected to the processor;

wherein the processor is configured to:

determine at least one set of random access resources; and send a random access preamble to a network device based on the at least one set of random access resources;

wherein the processor is further configured to:

determine a reception time of a random access feedback according to a last symbol of a time domain resource in each set of random access resources; or determine a reception time of a random access feedback according to a last symbol of a last time domain resource in the at least one set of random access resources.

16. The terminal according to claim 15, wherein the random access resource comprises at least one of:

a time domain resource;

a frequency domain resource;

a random access preamble; or a quasi co-location parameter.

17. The terminal according to claim 16, wherein at least two sets of random access resources comprise at least one of:

frequency domain resources; and the frequency domain resources comprised in any two sets of random access resources of the at least two sets of random access resources being different, time domain resources; and the time domain resources comprised in any two sets of random access resources of the at least two sets of random access resources being different, random access preambles; and the random access preambles comprised in any two sets of random access resources of the at least two sets of random access resources being different, or quasi co-location parameters; and the quasi co-location parameters of any two sets of random access resources of the at least two sets of random access resources being different.

18. A network device, comprising:

a processor; and a transceiver connected to the processor;

wherein the processor is configured implement the random access method according to claim 8.

19. The network device according to claim 18, wherein the random access resource comprises at least one of:

a time domain resource;

a frequency domain resource;

a random access preamble; or a quasi co-location parameter.

20. The network device according to claim 19, wherein at least two sets of random access resources comprise at least one of:

frequency domain resources; and the frequency domain resources comprised in any two sets of random access resources of the at least two sets of random access resources being different, time domain resources; and the time domain resources comprised in any two sets of random access resources of the at least two sets of random access resources being different, random access preambles; and the random access preambles comprised in any two sets of random access resources of the at least two sets of random access resources being different, or quasi co-location parameters; and the quasi co-location parameters of any two sets of random access resources of the at least two sets of random access resources being different.

* * * * *